United States Patent [19]

Chen

[11] Patent Number: 4,884,593

[45] Date of Patent: Dec. 5, 1989

[54] VALVE FOR CHECKING TIRE PRESSURE

[76] Inventor: Kwang-Ho Chen, No. 407, Chunghsiao E. Road, Section 6, Taipei, Taiwan

[21] Appl. No.: 263,623

[22] Filed: Oct. 27, 1988

[51] Int. Cl.$^4$ .................... F16K 37/00; F16K 15/20
[52] U.S. Cl. ................................... 137/557; 137/224; 137/227
[58] Field of Search ..................... 137/224, 227, 557

[56] References Cited

U.S. PATENT DOCUMENTS

| 1,258,114 | 3/1918 | Hayward | 137/224 |
| 1,769,508 | 7/1930 | Harned | 137/227 |
| 2,721,572 | 10/1955 | MacDonald | 137/227 |
| 4,594,960 | 6/1986 | Nalence | 137/227 |

Primary Examiner—A. Michael Chambers
Attorney, Agent, or Firm—Bernard R. Gans

[57] ABSTRACT

A valve for checking tire pressure comprising a hollow cylinder, a sealing block, a plate, a spring and a flute. The hollow cylinder has a flange inwardly extending at intermediate portion thereof to form an opening and divide the hollow cylinder into upper and lower portions. The sealing block is disposed in the lower portion of the hollow cylinder and contacts with the flange to seal the opening. The sealing block is provided with a passage communicating both sides of the sealing block. The plate has a pin downwardly extending into the opening and contacting the sealing block and a seat formed on upper surface of the plate. The spring is disposed on the seat of the plate. The flute mounted on the hollow cylinder includes a base and a flute body disposed on the base. A passage is formed in the base which communicates the flute body with the upper portion of the cylinder. When the tire pressure is too low, the spring will force the sealing block moving downwardly to form a gap between the flange and the sealing block and push a stem of a tire nozzle moving downwardly, so that air contained in the tire leaks out to reach the flute and provide a sonic signal for notifying users.

1 Claim, 4 Drawing Sheets

VALVE FOR CHECKING TIRE PRESSURE

BACKGROUND OF THE INVENTION

Each tire of an automobile has a nozzle for pumping in or leaking out the air therein in order to keep air pressure of the tire maintaining in a suitable range. At the beginning, air is pumped into the tire reaching a high level of air pressure for use. It is known that the air will leak out gradually. After a period of time, the air pressure is too low, so that the user must pump air into the tire again to reach the high level of air pressure.

There is no problem for the user to prevent the air pressure of the tire from reaching to over high pressure. That is, the user can easily adjust the tire pressure when pumping air into the tire. However, when air of the tire gradually leaks, it is difficult for the user to realize that whether the tire pressure is too low. It is dangerous that the user drives a car with tires of low pressure because the tires will cause too much heat when rolling on ground.

It is, therefore, an objective of the present invention to provide a valve for checking tire pressure which may obviate and mitigate the above-mentioned drawbacks.

SUMMARY OF THE INVENTION

It is a main objective of the present invention to provide a valve for checking tire pressure which comprises a spring, a plate and a sealing block to force a stem of tire nozzle moving downward, so that air of the tire leaks out when the tire pressure is too low.

A further objective of the present invention is to provide a valve for checking tire pressure which comprises a flute to provide a sonic signal when air of the tire leaks out.

The novel features which are characteristics of the invention, together with further objectives and advantages thereof will be better understood from the following description considered in connection with the accompanied drawings and in which a preferred embodiment of the invention is illustrated by way of exmple. It is to be expressly understood, however, that the drawings are for the purpose of illustration and description only and are not intended as a definition of the limits of the invention.

DETAILED DESCRIPTION OF THE DRAWINGS

Figure 1:
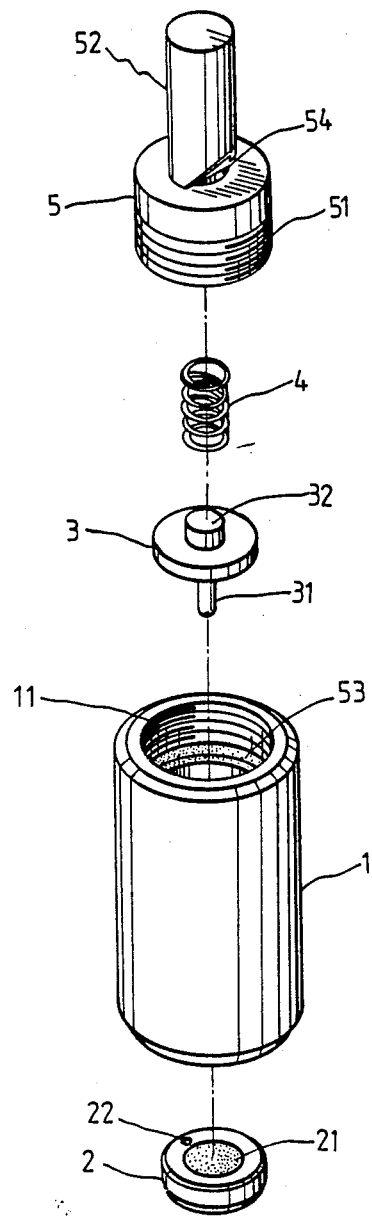
FIG. 1 is a perspective view of a valve according to the present invention.

Referring to FIG. 1, a valve 10 according to the present invention comprises a hollow cylinder 1, a sealing block 2, a plate 3, a spring 4 and a flute 5. As can be better seen in FIGS. 2 and 3, a separating flange 13 inwardly extends at intermediate of the hollow cylinder 1 to form an opening 14 and divide the inner space of the cylinder 1 into upper and lower portions. Each of the portions is provided with inner screw threaded bushings 11 or 12. The sealing block 2 has a seal 21 disposed on upper surface thereof and a passage 22 communicating both sides of the sealing block 2. Generally, the sealing block 2 is disposed in the lower portion of the hollow cylinder 1 and contacts with lower surface of the flange 13 to seal the opening 14.

The plate 3 is disposed in upper portion of the hollow cylinder 1. The plate 3 comprises a pin 31 extending perpendicularly downward from said plate into the opening 14 to contact with the sealing block 2. The plate 3 is provided with a seat 32 on upper surface thereof to allow the spring 4 positioned thereon. The flute 5 has a base 51 and a flute body 52 disposed on the base 51. The base 51 comprises a seal 53 engaged at lower end thereof and outer screws 54 at lower portion, so that the flute 5 can be mounted on the upper portion of the hollow cylinder 1 with the outer screws 54 engaging with the inner screw threaded bushing 11 and contact with upper end of the spring 4. A passage 54 is formed in the base 51 to communicate the space of upper portion of the hollow cylinder 1 and the flute body 52.

Figure 2:
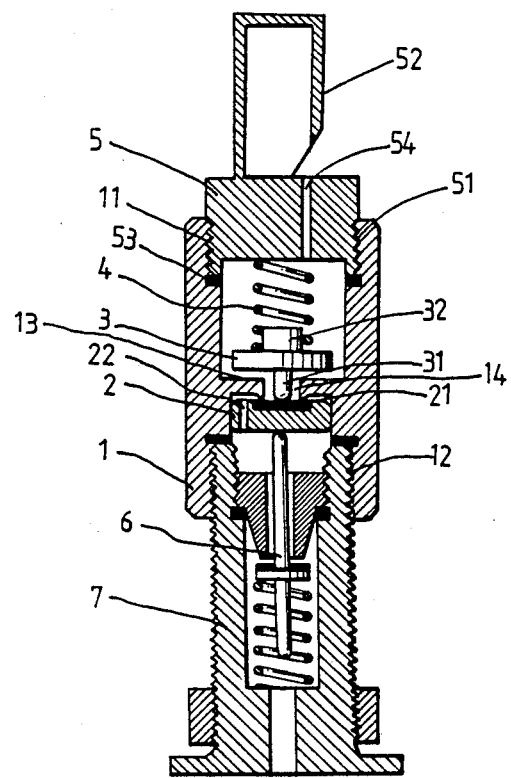
FIG. 2 is a cross-sectional view of the valve showing the valve in a closed position when the tire pressure is high enough.
Figure 3:
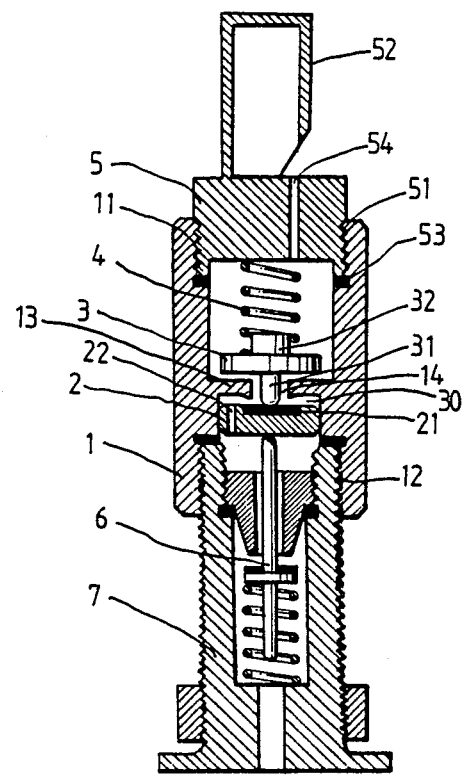
FIG. 3 is a cross-sectional view of the valve showing the valve in an open position when the tire is too low.

Referring to FIG. 2, when the tire pressure is high enough, a stem 6 of conventional nozzle 7 is presses by air contained in the tire and upwardly pushes the sealing block 2, so that the sealing block 2 seals the opening 14 of the valve 10. As shown in FIG. 3, when the tire pressure is too low, the force of air for pushing the stem 6 is less than the force of the spring 4, that is, the plate 3 will be pushes downwardly to move the sealing block 2. Then, a gap 30 is formed between the flange 13 and the sealing block 2. Meanwhile, the stem 6 is pushed downwardly by the sealing block 2, thereby the air contained in the tire flows through the passage 22, the gap 30, the opening 14 and the passage 54 to the flute body 52, so that the flute body 52 will provide a sonic signal. That is, when the tire pressure is too low, the valve 10 can provide a sonic signal to notify the user.

Figure 4:
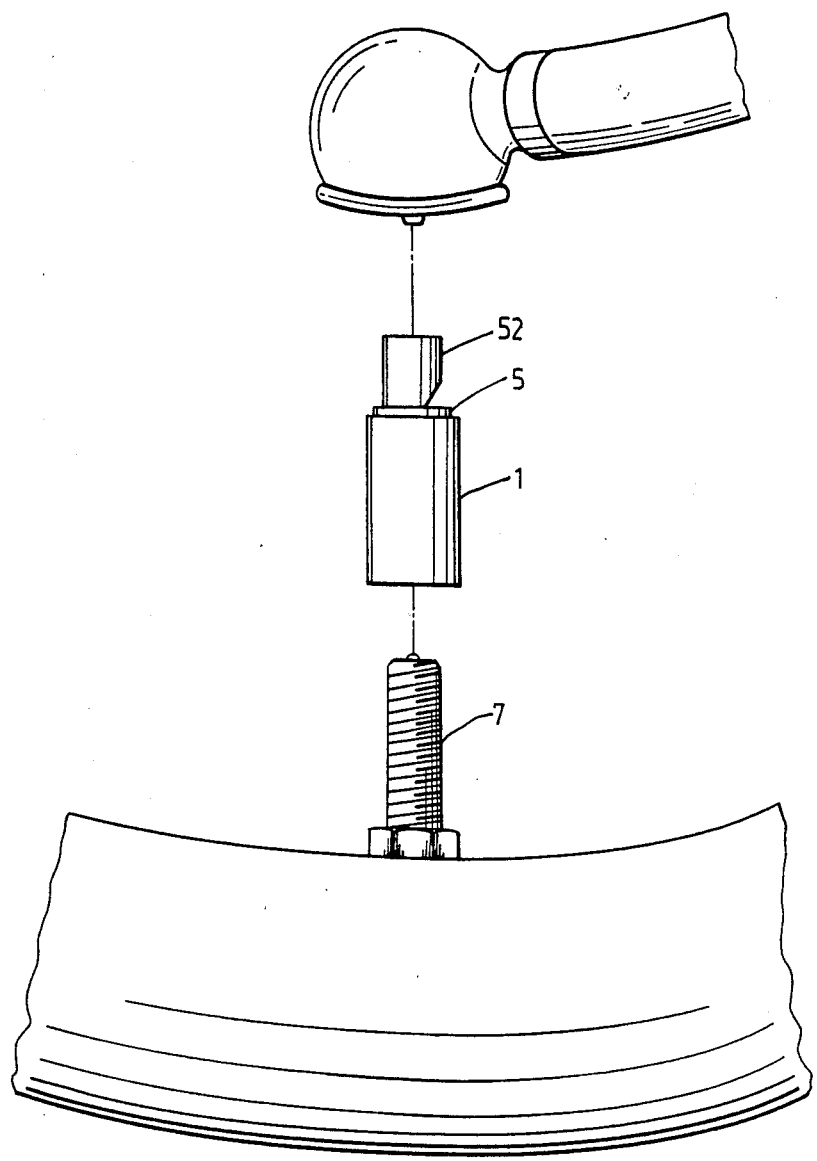
FIG. 4 is a plane view showing the air to be pumped into the tire by conventional method.

If the user intends to pump air into the tire, the valve 10 can be easily removed from the nozzle 7 of the tire, as shown in FIG. 4, and then pumps air through the nozzle 7 into the tire.

Although this invention has been described with a certain degree of particularity, it is understood that the present invention is made by way of example only and that numerous change in the detail of construction and the combination and arrangement of parts may be resorted to without departing from the scope of spirit of the invention as hereinafter claimed.

I claim:

1. A valve for checking tire pressure, comprising:
    a hollow cylinder having a flange inwardly extending to form an opening, and dividing the hollow cylinder into an upper and lower portion, a first screw threaded bushing coacting with internal walls arranged at said upper portion, and a second screw threaded bushing coacting with internal walls arranged at said lower portion, for receiving a flute and valve stem, respectively;
    a sealing block disposed in said lower portion of said hollow cylinder, and having a lower surface which directly abuts the valve stem, said stem controlling a fluid pressure source from a tire, providing contact with said flange, said sealing block having a seal disposed on its upper surface thereof and a passage communicating both sides of said sealing block;

a plate disposed in said upper portion having a pin extending perpendicularly downward into said opening and a seat formed on an upper surface of said plate;

a spring mounted on said seat of said plate, and a flute mounted on upper portion of said hollow cylinder including a base and a flute body disposed on said base, said base having outer screws to engage with said first screw threaded bushing of said hollow cylinder and a passage communicating said upper portion of hollow cylinder and said flute body.

* * * * *